July 23, 1963 L. G. METZGER ETAL 3,098,989

SERIALLY CONNECTED COURSE AND FINE INDUCTORS WITH CONTINUOUS ADJUSTMENT

Filed Oct. 18. 1960 3 Sheets-Sheet 1

INVENTORS
LEWIS G METZGER, AND HAROLD GOODMAN

BY Mason, Fenwick & Lawrence
ATTORNEYS

INVENTORS
LEWIS G. METZGER,
AND
HAROLD GOODMAN
BY
Mason, Fenwick & Lawrence
ATTORNEYS INVENTORS
LEWIS G. METZGER,
AND
HAROLD GOODMAN
BY Mason, Fenwick & Lawrence
ATTORNEYS United States Patent Office 3,098,989
Patented July 23, 1963

3,098,989
SERIALLY CONNECTED COURSE AND FINE INDUCTORS WITH CONTINUOUS ADJUSTMENT
Louis G. Metzger and Harold Goodman, New York, N.Y., assignors to Cosmos Industries, Inc., Long Island City, N.Y., a corporation of New York
Filed Oct. 18, 1960, Ser. No. 63,313
4 Claims. (Cl. 336—131)

The present invention relates in general to tuning devices for narrow band radio communication apparatus where precise and accurate indication of absolute frequency and extreme frequency stability are essential and more particularly to tuning apparatus for variable frequency oscillators and other associated tuned circuits having a main variable element varied by rotation of a shaft for changing frequency and a compensating element for precisely relating frequency change with shaft rotation.

While apparatus of the present invention may be employed in a wide variety of applications where it is desired to effect variation of a condition established predominantly by a main variable element by shifting the element in response to rotary motion of a shaft and to compensate departures of the condition established by the main variable element from a selected relationship to shaft rotation by a compensating element adjusted in response to the position of the shaft, the invention will be specifically described in conjunction with a permeability tuned variable frequency oscillator employing permeability tuned inductors which was especially designed for use in a high performance narrow band communications receiver.

Variable frequency oscillators employing permeability tuning wherein frequency change results from a change in longitudinal position of a powdered iron core moving inside of an inductor, and the longitudinal position of the core is determined by a lead screw or an externally threaded rotatable shaft, have been well known. In such units, it has been customary to mount the movable core in such fashion so that rotation of the lead screw or threaded tuning shaft produces axial movement of the core with respect to the cooperating inductor. If it is desired to have the frequency of the oscillator vary linearly with the longitudinal displacement of the case with respect to its cooperating inductor, the inductor must be precisely wound in a non-linear fashion and even with the utmost of care, precise linearity is very costly and difficult to achieve. Also each and every oscillator would present a new problem and no two non-linear inductors would be alike thereby making economical mass production of the device impossible. Many irregularities in the tuning characteristic of the oscillator or other L-C combination tuned in the same manner have resulted and precise repeatability from device to device cannot be obtained. Critical factors involved in obtaining precise linearity of frequency change with lead screw rotation are the non-homogeneity of the powdered iron core composition, axial twist of the powdered iron core, non-linearity in the winding of the cooperating inductor, errors in the pitch of the threads of the lead screw or threaded tuning shaft, and backlash between the lead screw and the core.

Efforts have been made to compensate for departures of the tuning characteristic curve from the desired linearity by imparting an adjusted amount of twist or angular tilting movement to the core or the cooperating inductor winding form at various longitudinal positions of the core, which produces minute longitudinal movement of the core with slight axial twist through the cooperation of the core threads with the threads of the lead screw which drives the core. Typical of this approach are the arrangements disclosed in U.S. Patents No. 2,468,071, No. 2,728,235 and No. 2,897,464. In each of these devices the degree of additional or desirable compensating longitudinal motion of the core together with an undesirable axial tilt is established by adjustment of a plurality of washer-like elements forming an irregular lineal cam coacting with followers projecting from the core. By adjustment of the washers or cam-forming elements, a limited amount of longitudinal compensating correction of the movable core can be established for the various core positions. However, in the first two of the above-mentioned prior patents, this adjustment of the washers must be made while the unit is out of the can or shield in which it is substantially to be enclosed. Consequently, subsequent enclosure of the unit disturbs this adjustment and frequently necessitates disassembly of the unit and very difficult readjustment of the washers to attempt to compensate for variations which will be introduced by enclosure of the unit. U.S. Patent No. 2,897,464 attempts to overcome this disadvantage by mounting primary adjusting washers on the inner surface of the can and providing an additional set of washers and an angularly adjustably and axially driven follower to produce selected angular adjustment of the can relative to the lead screw and core axis to compensate for variations which are introduced by the can itself.

An object of the present invention is the provision of novel means for compensating departures of selected parameters of a sealed metal shielded device varying with angular rotation of a shaft from consistent variation with shaft rotation, wherein the compensating means are adjustable from externally of the shielding enclosure.

Another object of the present invention is the provision of novel means for varying the position of a controlling member consistently and precisely in relationship to the rotating of a shaft.

Another object of the present invention is the provision of a novel device capable of capacity or permeability tuning to establish any predetermined sinusoidal, logarithmic, parabolic, and the like variance when analog motion is transmitted to a shaft and translated to a precise frequency variation.

Another object of the present invention is the provision of novel means for precisely adjusting the tuning characteristics of a permeability tuned coil coupled to a single rotatable shaft.

Another object of the present invention is the provision of a canned variable frequency oscillator having novel means adjustable from externally of the can and shifted in accordance with the rotation of a single shaft to produce movement of the movable core of an adjustable inductor for the oscillator to produce a consistent frequency change characteristic (linear, logarithmic, parabolic, or illogical).

Another object of the present invention is the provision of a metal shielded variable frequency capacitor tuned oscillator having novel means adjustable from externally of the cam and frequency, shifted in accordance with the rotation of a single shaft to produce a consistent frequency change characteristic such as linear, sinusoidal, logarithmic, parabolic, or illogical frequency change characteristics.

Another object of the present invention is the provision of novel apparatus for varying a main variable element in selected relation to rotation of a drive shaft together with means for varying a compensating or correcting element to an adjustable extent in accordance with rotation of the drive shaft to compensate for departures of the condition established by the main variable element from a selected condition.

Other objects, advantages and capabilities of the present invention will become apparent from the following detail description, taken in conqunction with the accompanying drawings illustrating a preferred embodiment of the invention.

Figure 1:
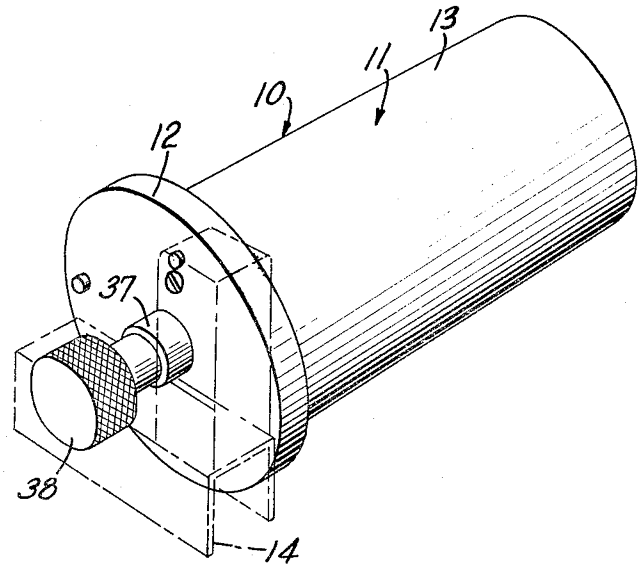
FIGURE 1 is a perspective view of an oscillator tuning unit constructed in accordance with the present invention.
Figure 2:
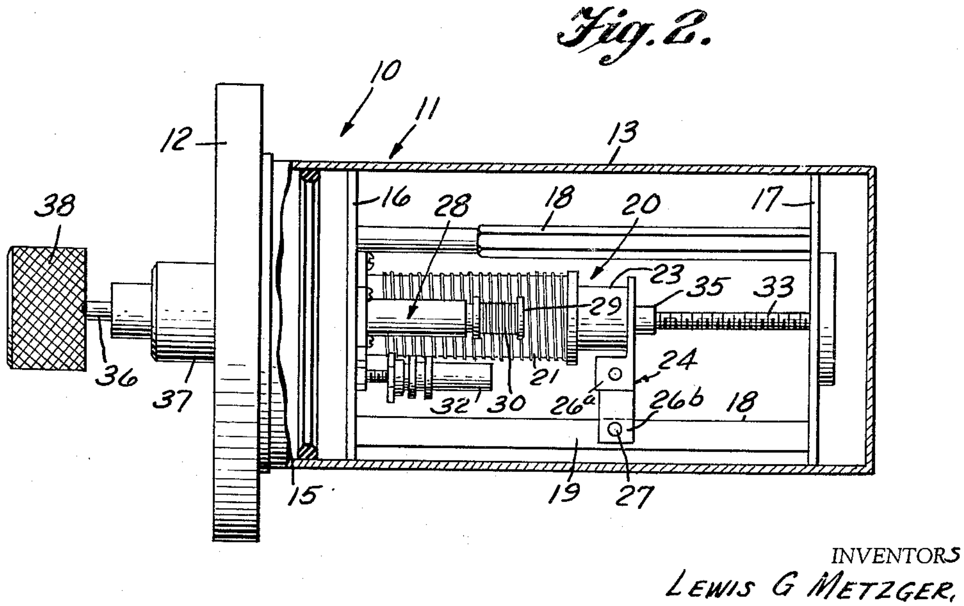
FIGURE 2 is a top plan view of the oscillator tuning unit.
Figure 3:
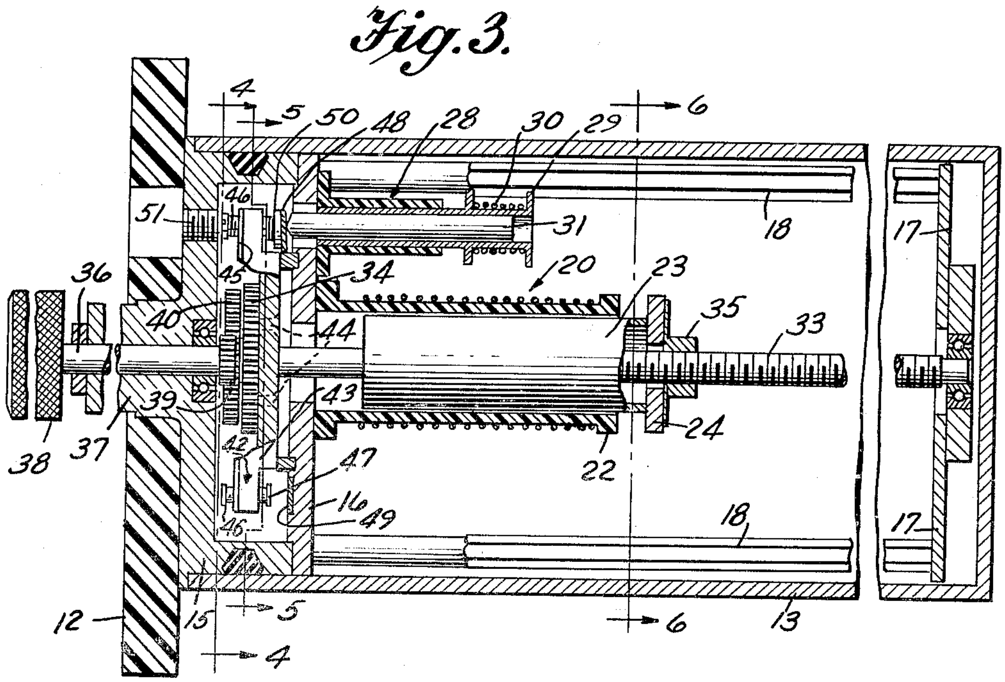
FIGURE 3 is a longitudinal vertical section view taken along the line 3—3 of FIGURE 2.

Referring to the drawings, wherein like reference characters designate corresponding parts throughout the several figures, the permeability tuned oscillator of the present invention, indicated generally by the reference character 10, is designed as a unitary assembly inserted in a metal can forming a rigidly constructed continuously variable frequency source which is thermostatically controlled by an oven and temperature compensated so that its frequency output is extremely stable under conditions of adverse environment.

This continuously varaible frequency source is designed to be calibrated to the rotation of a shaft so that when the shaft is coupled to any precise read-out device or micrometer vernier, accurate read-out may be made or the oscillator can be set to an accurate frequency. The read-out device may be linear, non-linear, or may be pre-set to any desired consistent logical or illogical sequence, and a suitable calibration can be pre-set into the variable frequency oscillator. The device is capable of linearizing or non-linearizing any variable inductance or capacitance or combination thereof and relating the change in inductance or capacitance or frequency to the precise analog position of a shaft. The unit is capable of being simply adjusted and calibrated at every point within its selected frequency range by means of a simple front panel control to permit the unit to be calibrated to have very precise accuracy of frequency adjustment in relation to rotation of the shaft. Actual measurements taken on the unit herein described indicate a consistent repeatable accuracy in the order of 30 cycles per second at approximately 3 megacycles to be the order of accuracy attainable in this system.

Figure 7:
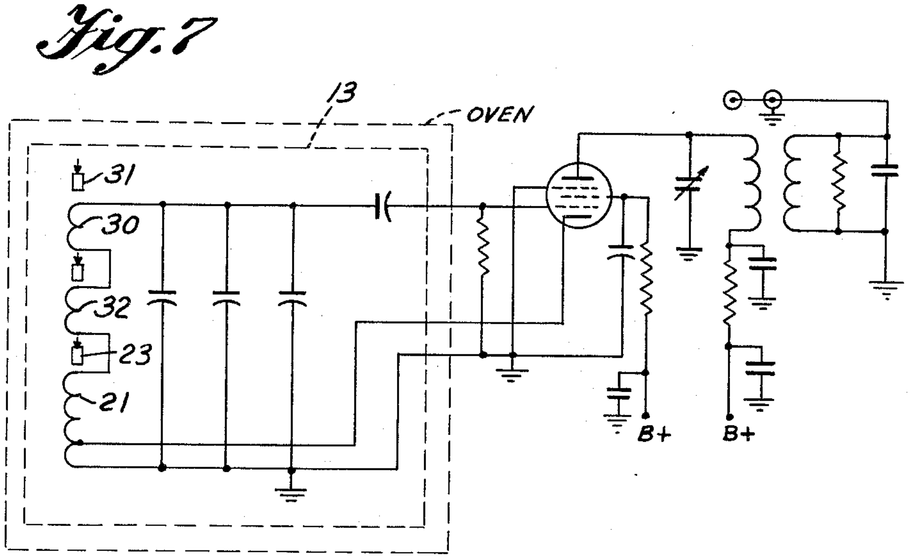
FIGURE 7 is a schematic diagram of an exemplary permeability tuned oscillator circuit embodying the present invention.

In general, the basic circuitry of the oscillator, illustrated schematically in FIGURE 7, is that of an electron coupled Hartley oscillator, wherein frequency change results from a change in longitudinal position of a powdered iron core moving inside of a precisely wound main inductor. It will be understood, however, that other types of oscillator circuits than the Hartley oscillating at different frequencies could be employed in this same configuration. In one preferred example, the variable frequency oscillator uses a miniature type pentode tube and operates in the frequency range of 2.455 megacycles to 3.455 megacycles, with ten turns of a main tuning shaft producing a frequency change of exactly one megacycle. Absolute frequency stability against time at any one frequency setting of this device is a function of the stability temperature surrounding the L-C circuit of the device and higher degrees of the frequency stability may be obtained by employing more sensitive thermostatic control of the oven. In actual practice on this device, frequency change due to oven cycling at extremes of temperature is of the order of 4 cycles to 9 cycles per second during each oven cycle.

In the preferred construction herein described, the tuning components are arranged as a hermetically sealed oscillator tuning unit 11 having a circular front panel 12 to the rear of which projects a cylindrical housing can 13 enclosing at least the inductive reactance elements of the tank circuit of the oscillator, and on the front of which may be supported the remaining elements of the oscillator circuit as indicated diagrammatically by broken lines at 14. The housing can 13 is removably fitted over and encloses an inner frame assembly for the tuning unit components comprising a generally cup-shaped drive mechanism housing 15, a circular base plate 16 and a circular frame plate 17 spaced from and paralleling the base plate 16, connected thereto by a plurality of support rods 18, one of which is of rectangular cross-section and forms a guide rail 19.

Disposed within the cage formed by the base and frame plates 16 and 17 and the support rods 18 is a main slug tuned inductor 20 comprising a coil 21 wound on, deposited on, or embedded in a suitable rigid hollow coil form 22 rigidly mounted on the base plate 16 in concentric relation to the axis of the base plate. A cylindrical core member 23 of suitable magnetically permeable material, such as a powdered iron core, extends telescopically within the coil form 22 and is mounted so as to be axially movable with respect to the coil 21. The core member 23 is held against angular displacement relative to the common axis of the core member and coil by means of a guide rail follower 24 rigidly fixed to the rearward or outer end of the core member 23 and having a pair of arms 25, 26 which flank the opposite sides of the guide rail in sliding engagement with the guide rail. In the preferred construction herein illustrated, the follower 24 is provided with an annular base portion which is fixed to the rearmost end of the core member 23 and has an integral arm 25 projecting therefrom into lapping relation with one side of the guide rail 19 and an integral stub arm *26a* which terminates short of the guide rail 19 and has fixed thereto a leaf spring extension *26b* which continues into lapping relation with the opposite side of the guide rail 19, the ends of arms 25 and 26 each carrying a wear button 27 which extends into sliding engagement with the adjacent side of the guide rail 19.

Also supported on the base plate 16 is a compensating inductor 28 comprising a fixed hollow coil form 29 having a coil 30 wound thereon and an axially slidable cylindrical slug or core 31 supported within the coil form 29 and resiliently biased toward the base plate 16. Additionally, an adjustable end point correcting coil 32 wound on a suitable coil form and having a tuning slug adjustable by a suitable set screw, is mounted on the base plate 16.

The longitudinal position of the core member 23 of the main slug tuned inductor 20 is axially adjusted to effect change of frequency of the permeability tuned oscillator circuit by rotation of a lead screw 33 extending coaxially through the main coil form 22 and core member 23, the ends of the lead screw 33 being journaled in suitable bearings in the rear frame plate 17 and base plate 16 and having a gear 34 fixed to the front end thereof and disposed forwardly of the base plate 16 within the drive mechanism housing 15. The front end of the core member 23 has an axially inserted nut and the rearmost end of the core has a threaded bushing or collar 35 fixed thereto and in driven engagement with the threads of the lead screw 33 to effect axial movement of the core member 23 within the coil form 22 in response to rotation of the lead screw. The lead screw 33 is driven by a suitable gear reduction drive from a drive shaft 36 journaled in the boss 37 formed integrally with and projecting forwardly of the drive mechanism housing 15 through a suitable opening in the front panel 12, the drive shaft 36 having a suitable knob 38 on the outer end thereof.

The gear 34 on the front end of the lead screw 33 is driven from the drive shaft 36 by a reduction gear train comprising a small diameter gear 39 on the rear end of the drive shaft 36, and a gear set comprising a large diameter gear 40 in driving engagement with the gear 39 and a small diameter gear 41 integral or fixed with the gear 40 and in driving engagement with the lead screw gear 34, the gear set comprising gears 40 and 41 being journaled on a suitable stub shaft projecting from the front wall of the drive mechanism housing 15. The gears 34, 39, 40 and 41 in this exemplary embodiment may be of the anti-backlash type and designed so that ten complete turns of the drive shaft 36 will so vary the position of the main inductor core member 23 as to yield a frequency change of, for example, exactly one megacycle, or precisely one hundred kilocycles per turn of the drive shaft 36.

Figures 4, 6:
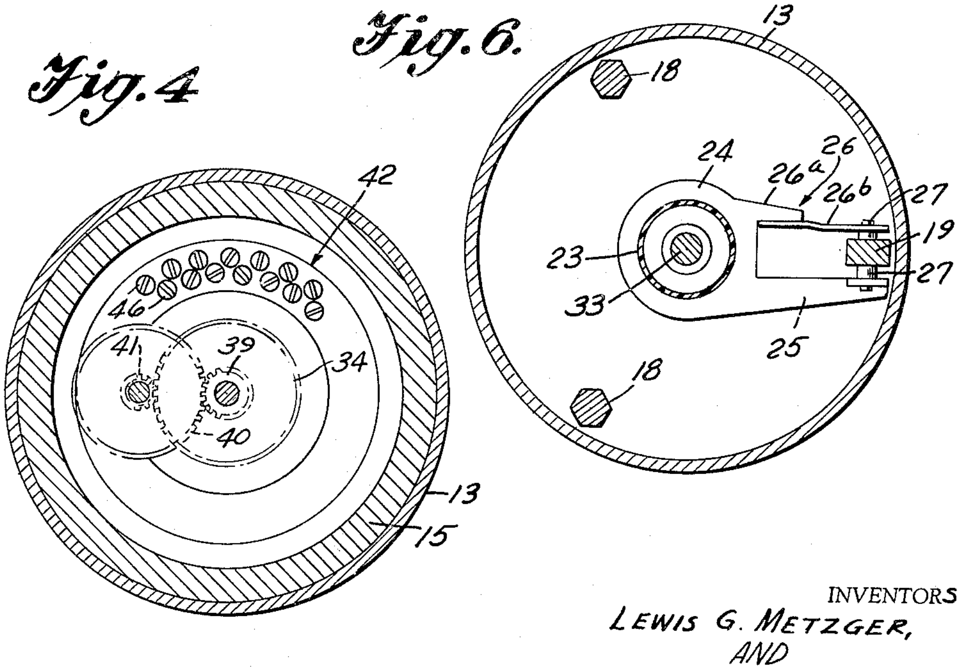
FIGURE 4 is a transverse vertical section view taken along the lines 4—4 of FIGURE 3.
FIGURE 6 is a transverse vertical section view taken along the lines 6—6 of FIGURE 3.
Figure 5:
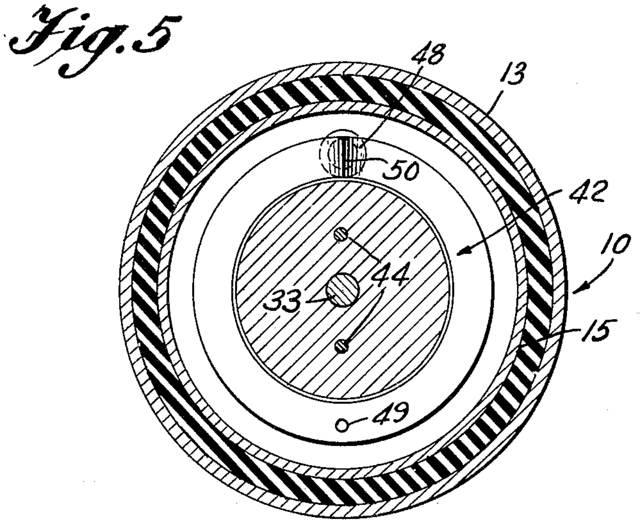
FIGURE 5 is a transverse vertical section view taken along the lines 5—5 of FIGURE 3.

In the actual commercial form of the permeability tuned oscillator the frequency determining elements of the circuit are contained in an especially designed thermostatically controlled oven at a temperature of 75° C. so as to provide extreme temperature stability when the oven is operating. Careful attention to the design of the structure and the selection of the materials used in its construction result in a unit which is extremely stable frequency-wise to changes in temperature, even when the oven is not in operation. It is also found that the obtaining of precise consistent linearity of frequency change with drive shaft rotation is normally difficult to realize due to such factors as non-homogeneity, or non-uniformity of the powdered iron core composition, inconsistencies of reproducing the desired degree of non-linearity in the winding of the main inductor coil 21, deviations in the lead screw pitch, and play or eccentricity between the lead screw and the main inductor coil. Such non-linearity of frequency change with respect to drive shaft rotation is overcome by means of the compensating coil 28 whose inductance may be varied as a function of lead screw rotation to add varying amounts of inductance in series with the inductance of the main inductor coil 21. The adjustment of the axial position of the tuning slug 31 of the compensating coil 30 to various positions as a function of lead screw rotation is effected by means of a cylindrical adjustable cam 42 formed of a rotating cam base disk 43 which is fixed to the lead screw gear 34 on the front end of the lead screw 33 in concentric relation therewith by mounting screws 44. A thin plastic disk 45, made from tough, resilient material such as nylon, Delrin, Teflon and the like, overlays the front face of the cam base disk 43 adjacent the periphery thereof, the plastic disk 45 having undersized holes tapped therein registering with tapped holes provided in the cam base disk 43 to axially support without cocking adjustable cam screws 46 arranged in a pattern, for example, as illustrated in FIGURE 4, on two different chosen diameters of the cam 42. The flat cylindrical heads 47 of the cam screws 46 lie rearwardly of the cam base disk 43 and form the working cam surface to be followed by a cam follower 48 constructed, for example, in the form of an annular member of thin, flat spring material which surrounds the lead screw gear 34 and is fixed at one circumferential point 49 diametrically opposite the compensating inductor 28 to the base plate 16. The cam follower is sprung away from the base plate 16 in the region diametrically opposite its fixed mounting point 49 which carries a radially elongated nose 50 disposed to engage and follow the contours defined by the heads 47 of the cam screws 46. The portion of the cam follower 48 having the nose formation 50 bears directly against the tuning slug 31 of the compensating coil 30 so that movement of the nose portion of the cam follower 48 in response to the configuration established by the cam screw heads 47 will be transmitted to the compensating coil tuning slug 31 to vary the inductance of the compensating coil. Because of the fact that the tapped holes in the plastic cam disk 45 are registered with the tapped holes in the cam disk 43 and are also undersized and due to the special properties of the material of the plastic disk, the plastic will firmly centrally grip the stems of the cam screws 46 without wear, seizing or binding and hold the screws against accidental displacement or cocking from their adjusted positions.

The flat cylindrical heads of the cam screws 46 form an effectively continuous but stepped cylindrical cam curve. When observed from the center of the cam base disk 43, the cam screws 46 will slightly overlap, so that the cam follower nose 50 will always be in full contact with one cam screw head, or for a short, angular interval with two consecutive cam screw heads. By staggering the arrangement of the cam screws 46 as illustrated in FIGURE 4, the number of cam screws is increased and the amount of accuracy and smoothness by which the tuning can be adjusted are improved. The cam screws 46 have slotted ends or hexagonally recessed ends facing forwardly of the cam 42 to permit manual adjustment of the cam screws 46 by means of a screwdriver or special tool projected through a closable access opening 51 in the front wall of the drive mechanism housing 15. This access opening 51 may be threaded as illustrated in the drawings to permit a suitable threaded plug to be inserted therein to normally close the access opening and preserve the hermetically sealed condition of the tuning unit.

With this construction, the tuning unit can be compensated to provide precise linearity of frequency variation with drive shaft rotation by rotating the drive shaft 36 in selected angular increments through the full tuning range of the unit and adjusting the cam screws 46 to actuate the cam follower and the slug 31 of the compensating inductor 28 to increase or reduce the inductance introduced into the oscillator tuning circuit by the inductor 28 by appropriate amounts to achieve the desired linearity. The gear ratios and arrangement of the cam screws 46 in the above-described exemplary embodiment are such that for every 90° of rotation of the drive shaft 36 through the total one megacycle tuning range of ten full turns, a different cam screw 46 is presented in alignment with the compensator tuning slug 31 and the access opening 51. The unit can be readily calibrated by measuring the output frequency at each 90° position of the drive shaft 36 throughout the total tuning range, and adjusting the cam screw 46 in registry with the access opening 51 at each of these measured positions to establish adjustment of the compensator coil slug which will add the appropriate amount of inductance to the tuning circuit to linearize frequency variations with shaft rotation. It will be appreciated that introduction of inductance compensation into the tuning circuit in this manner permits final compensation adjustments to be made after the unit has been enclosed in its shielding enclosure, permitting closer frequency tolerances and avoiding disturbance to the frequency characteristics which may arise if the unit were enclosed subsequent to adjustment.

The end point correcting coil 32 is provided in series with the main inductor 20 to establish end point adjustments which will provide the complete frequency range precisely 2.455 mc. to 3.455 mc. with exactly ten turns of the drive shaft 36. This adjustment may be used to restore the frequency output to the desired 1 mc. coverage for ten turn shaft travel if circuit aging caused the frequency coverage to change appreciably.

More adjusting points could be provided and with suitable gear change 45° points could be linearized instead of 90° points. Also variations between adjusting points could be straight line extrapolated by changing the flat ends of the adjusting screws to points and stretching a malleable band from adjusting point to adjusting point. The principle of the present invention may also be applied to a main non-linear variable capacitor of the plunger or rotary type together with a small plunger type capacitor driven by the compensating screws. Also a combination of main capacitor and auxiliary compensating inductor would be feasible.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A tuning mechanism for a variable frequency oscillator comprising a shielding container including a front panel, having a closable access opening therein, a main inductance element disposed within said shielding container, a rotatable threaded shaft extending along a preselected axis through said container, said main inductance element including a coil member rigidly fixed within said container and a core member threadedly coupled to said threaded shaft within said container, said core member being moved along said axis in telescoping relation to said coil member in response to relative rotation between said core member and said threaded shaft to vary the inductance of said inductance element and vary the frequency of the oscillator consistently and continuously through a elected range at a predetermined rate, guide means for holding said core member against rotation about the axis of said shaft, rotatable means extending externally of said container for rotating said threaded shaft in preselected relation to rotation of said external rotatable means, a compensating inductance element intercoupled in circuit relation with said main inductance element to vary the cumulative inductance of said elements, said compensating inductance element including a rigidly mounted coil and an axially movable tuning slug, a cam plate intercoupled with said threaded shaft for coordinate rotation with said threaded shaft, said cam plate having a plurality of adjusting screws disposed on a circular path concentric with the axis of the cam plate, each of said adjusting screws having a head portion forming a working cam surface and a slotted portion disposed to be presented to the access opening in said front panel to permit axial adjustment of the position of said working head portion by a tool projected through said access opening into engagement with said slotted portion, a cam follower member having a cam follower nose biased toward said working cam surfaces of said adjusting screws for transmitting motion to said tuning slug of said compensating inductance element to vary the longitudinal position of said tuning slug and thus the inductance of said compensating inductance element in accordance with the axial adjusted portion of said adjusting screws, the rotation of said cam plate, the circumferential spacing of the adjusting screws, and the configuration of the cam follower nose being such as to continuously adjust the compensating inductance element to produce cumulative inductance variation of said inductance elements producing a constant frequency change characteristic in accordance with a preselected function throughout the selected range of frequencies.

2. A tuning mechanism for a variable frequency oscillator comprising a shielding container including a front panel, having a closable access opening therein, a main inductance element disposed within said shielding container, a rotatable threaded shaft extending along a preselected axis through said container, said main inductance element including a coil member rigidly fixed within said container and a core member threadedly coupled to said threaded shaft within said container, said core member being moved along said axis in telescoping relation to said coil member in response to relative rotation between said core member and said threaded shaft to vary the inductance of said inductance element and vary the frequency of the oscillator consistently and continuously through a selected range at a predetermined rate, guide means for holding said core member against rotation about the axis of said shaft, rotatable means extending externally of said container for rotating said threaded shaft in preselected relation to rotation of said external rotatable means, a compensating inductance element intercoupled in circuit relation with said main inductance element to vary the cumulative inductance of said elements, said compensating inductance element including a rigidly mounted coil and an axially movable tuning slug, a cam plate intercoupled with said threaded shaft for coordinate rotation with said threaded shaft, said cam plate having a plurality of adjusting screws disposed on a circular path concentric with the axis of the cam plate each of said adjusting screws having a head portion forming a working cam surface and a slotted head portion disposed to be presented to the access opening in said front panel to permit axial adjustment of the position of said working head portion by a tool projected through said access opening into engagement with said slotted portion, a cam follower member having a cam follower nose biased toward said working cam surfaces of said set screws for transmitting motion to said tuning slug of said compensating inductance element to vary the longitudinal position of said tuning slug and thus the inductance of said compensating inductance element in accordance with the axial adjusted position of said adjusting screws, said adjusting screws being located closely adjacent each other to present a substantially continuous working cam surface to the cam follower nose through the selected variations and range of frequencies of the oscillator, the rotation of said cam plate, the positioning of the adjusting screws, and the configuration of the cam follower nose being such as to continuously adjust the compensating inductance element to produce cumulative inductance variation of said inductance elements producing a constant frequency change characteristic in accordance with a preseleted function throughout the selected range of frequencies.

3. A tuning mechanism for a variable frequency oscillator comprising a shielding container including a front panel, having a closable access opening therein, a main inductance element disposed within said shielding container, a rotatable threaded shaft extending along a preselected axis through said container, said main inductance element including a coil member rigidly fixed within said container and a core member threadedly coupled to said threaded shaft within said container, said core member being moved along said axis in telescoping relation to said coil member in response to relative rotation between said core member and said threaded shaft to vary the inductance of said inductance element and vary the frequency of the oscillator consistently and continuously through a selected range at a predetermined rate, guide means for holding said core member against rotation about the axis of said shaft, rotatable means extending externally of said container for rotating said threaded shaft in preselected relation to rotation of said external rotatable means, a compensating inductance element intercoupled in circuit relation with said main inductance element to vary the cumulative inductance of said elements, said compensating inductance element including a rigidly mounted coil and an axially movable tuning slug, a cam plate intercoupled with said threaded shaft for coordinate rotation with said threaded shaft, said cam plate having a plurality of adjusting screws disposed on a circular path concentric with the axis of the cam plate, each of said adjusting screws having a head portion forming a working cam surface and a slotted portion disposed to be presented to the access opening in said front panel to permit axial adjustment of the position of said working head portion by a tool projected through said access opening into engagement with said slotted portion, a cam follower member having a cam follower nose biased toward said working cam surfaces of said adjusting screws for transmitting motion to said tuning slug of said compensating inductance element to vary the longitudinal position of said tuning slug and thus the inductance of said compensating inductance element in accordance with the axial adjusted position of said adjusting screws, said adjusting screws being located along two circular paths of different diameters on said cam plate with the adjusting screws on one of the circular paths offset circumferentially relatively to the adjusting screws on the other circular path and spaced so that the adjusting screws appear to slightly overlap when viewed from the center of the cam plate, and said cam follower nose being of sufficient length to traverse all of said circular paths occupied by said adjusting screws, the the rotation of said cam plate, the positioning of the adjusting screws, and the configuration of the cam follower nose being such as to continuously adjust the compensating inductance element to produce cumulative inductance variation of said inductance elements producing a constant frequency change characteristic in accordance with a preselected function throughout the selected range of frequencies.

4. A tuning mechanism for a variable frequency oscillator comprising a shielding container including a front panel, having a closable access opening therein, a main inductance element disposed within said shielding container, a rotatable threaded shaft extending along a preselected axis through said container, said main inductance element including a coil member rigidly fixed within said container and a core member threadedly coupled to said threaded shaft within said container, said core member being moved along said axis in telescoping relation to said coil member in response to relative rotation between said core member and said threaded shaft to vary the inductance of said inductance element and vary the frequency of the oscillator consistently and continuously through a selected range at a predetermined rate, guide means for holding said core member against rotation about the axis of said shaft, rotatable means extending externally of said container for rotating said threaded shaft in preselected relation to rotation of said external rotatable means, a compensating inductance element intercoupled in circuit relation with said main inductance element to vary the cumulative inductance of said elements, said compensating inductance element including a rigidly mounted coil and an axially movable tuning slug, a cam plate intercoupled with said threaded shaft for coordinate rotation with said threaded shaft, said cam plate having a plurality of adjusting screws disposed on a circular path concentric with the axis of the cam plate, each of said adjusting screws having a head portion forming a working cam surface and a slotted portion disposed to be presented to the access opening in said front panel to permit axial adjustment of the position of said working head portion by a tool projected through said access opening into engagement with said slotted portion, a cam follower member having a cam follower nose biased toward said working cam surfaces of said adjusting screws for transmitting motion to said tuning slug of said compensating inductance element to vary the longitudinal position of said tuning slug and thus the inductance of said compensating inductance element in accordance with the axial adjusted position of said adjusting screws, said adjusting screws being located along two circular paths of different diameters on said cam plate with the adjusting screws on one of the circular paths offset circumferentially relative to the adjusting screws on the other circular path and spaced so that the adjusting screws appear to slightly overlap when viewed from the center of the cam plate, and said cam follower nose being of sufficient length to traverse all of said circular paths occupied by said adjusting screws, the rotation of said cam plate, the positioning of the adjusting screws, and the configuration of the cam follower nose being such as to continuously adjust the compensating inductance element to produce cumulative inductance variation of said inductance elements producing a constant frequency change characteristic in accordance with a preselected function throughout the selected range of frequencies, the drive ratio between said external rotatable means and said shaft being such that a different adjusting screw is presented in registry with said access opening for at least each 90° of rotation of said external rotatable means.

References Cited in the file of this patent

UNITED STATES PATENTS

| | | |
|---|---|---|
| 2,468,071 | Hunter | Apr. 26, 1949 |
| 2,561,537 | Sands | July 24, 1951 |
| 2,591,650 | Williams | Apr. 1, 1952 |
| 2,728,235 | Miffln | Dec. 27, 1955 |
| 2,808,506 | Skwarek | Oct. 1, 1957 |
| 2,810,834 | Stover | Oct. 22, 1957 |
| 2,947,866 | Valdettaro et al. | Aug. 2, 1960 |
| 2,957,356 | Meyer | Oct. 25, 1960 |
| 2,962,903 | Kemeny | Dec. 6, 1960 |